UNITED STATES PATENT OFFICE.

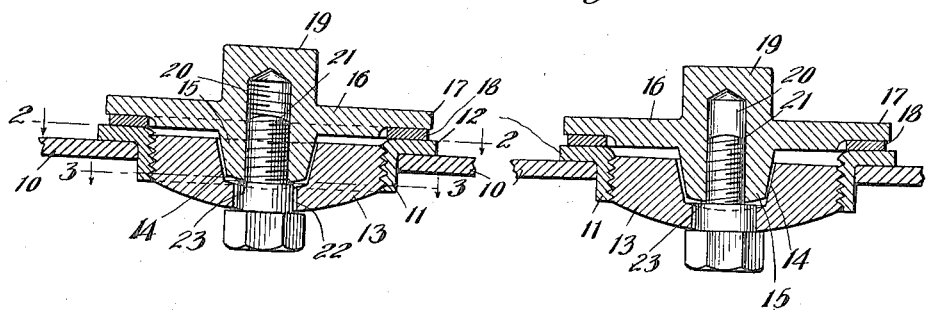
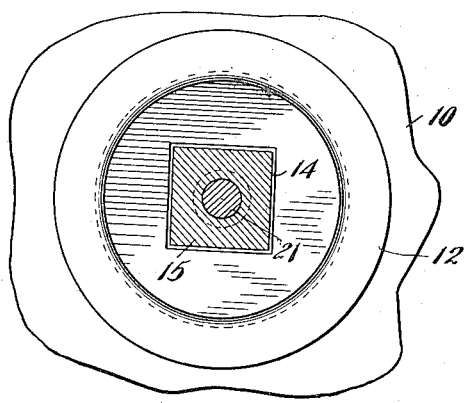
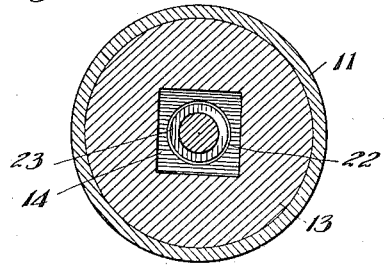

CHARLES T. CHILDERS, OF GALESBURG, ILLINOIS.

BUNG.

1,127,961.	Specification of Letters Patent.	Patented Feb. 9, 1915.

Application filed May 19, 1913. Serial No. 768,444.

*To all whom it may concern:*

Be it known that I, CHARLES T. CHILDERS, a citizen of the United States, residing in Galesburg, in the county of Knox and State of Illinois, have invented a new and useful Improvement in Bungs, of which the following is a specification.

This invention relates to improvements in bungs.

One object of the invention is to provide a bung composed of two members having a universal joint therebetween, one of said members being threaded and adapted to be screwed into a bung-hole bushing of a barrel, the other member having a sealing flange adapted to seat on a coöperating flange of the bushing to thereby insure a perfect seal at the bung-hole.

Another object of the invention is to provide a bung which is constructed of metal, which is cheap to manufacture and composed of few parts, and which has one member thereof universally self-seating on uneven surfaces surrounding the bung-hole to thereby provide a perfect seal or closure for a barrel or other container, the bung being more particularly designed for use in connection with metallic barrels for carrying gasolene and other inflammable liquids.

The invention furthermore consists in the improvements in the parts and devices and in the novel combinations of the parts and devices as herein shown, described or claimed.

In the drawing forming a part of this specification, Figure 1 is a diametrically sectional view of the bung embodying my improvements, the same being shown in place on a portion of a barrel or other container; Fig. 2 is a horizontal sectional view taken substantially on the line 2—2 of Fig. 1; Fig. 3 is another horizontal sectional view taken on line 3—3 of Fig. 1 and Fig. 4 is a view similar to Fig. 1 and showing the manner in which the bung will hermetically seal or close the bung-hole of a barrel in which the flange of the bushing is uneven or irregular relatively to the threaded portion thereof.

In said drawing a portion of a metallic barrel is shown at 10, the same being provided with a hole in which is seated an interiorly threaded bushing 11, the latter having a flange 12, said bushing being welded or otherwise suitably secured to the barrel 10 in any well-known manner. As will be apparent, in some instances the threaded portion for receiving the bung may be formed integral with the metal forming the barrel.

The improved bung comprises an exteriorly threaded plug 13 adapted to be threaded into the threaded portion 11 of the bushing, said plug 13 having an angular socket 14 in which is seated a corresponding angular boss 15 formed on the underside of a sealing disk 16, having a flange 17 and preferably provided with a sealing fiber washer 18 for engaging with the flange 12 of the bushing. The disk 16 is provided with a squared head 19 adapted to receive a wrench or other implement whereby the bung may be screwed into place. The disk at 16 is provided with a threaded socket 20 in which is threaded a bolt 21, the latter passing through an enlarged recess 22 in the plug 13 and having a shoulder 23 which engages the under face of the boss 15.

As will be understood, the boss 15 is made somewhat smaller than the socket 14 so that there will be a certain amount of play between the two members 13 and 16 to thereby allow of a universal adjustment therebetween, and on account of the angular formation of the socket 14 and boss 15 a rotation of the disk 16 will rotate with it the threaded plug 13 and as the parts are screwed into place. the plug 13 will move farther inward within the sleeve 11 thereby pulling down with it the disk 16 through the bolt 21 and clamping the latter firmly on the flange 12.

In transporting inflammable liquids, such as gasolene for instance, it is absolutely essential that a perfect seal be formed at the bung of the barrel, and as will be understood it is not feasible or practical to use rubber or other substance to form the bung since the same are readily attacked by the contents and are soon rendered unfit for further use. Where a metal bung is employed it is essential that some means be provided for compensating for unevenness or irregularities in the surface surrounding the bung-hole in order to insure a perfect seal, and on account of the universal adjustment between the plug 13 and disk 16, such as I have described, it is possible to seal the bung even when the flange of the bushing is uneven or when the bushing is not properly tapped at a right angle to the plane of the flange, which frequently occurs in barrels employing a threaded bung.

Although I have herein shown and described what I now consider the preferred embodiment of my improvements, yet it will be understood that various changes and modifications may be made in the details of construction, particularly in the method of uniting the plug and disk so that the same have a universal joint therebetween, without departing from the spirit of the invention, and all such changes and modifications are contemplated that come within the scope of the claims appended hereto.

I claim:

1. A self-seating rotatable bung including, in combination: an exteriorly threaded rotatable plug adapted to coöperate with an interiorly threaded bushing; a sealing disk rotatable with said plug; and means of uniting said disk and plug permitting a limited amount of oscillation therebetween, substantially as specified.

2. A self-seating bung for a receptacle having an internally threaded aperture and including in combination: two members having a universal joint connection therebetween, one of said members carrying a sealing flange and the other being threaded to engage in said aperture, and means by which both said members may be rotated from a single side, substantially as specified.

3. A self-seating bung including, in combination: an exteriorly threaded plug; a sealing disk rotatable with said plug; and means of uniting said disk and plug permitting a limited amount of oscillation therebetween, said means including an angular socket formed in one of said members and an angular boss formed on the other of said members seated in such socket, substantially as specified.

4. A self-seating bung for a receptacle having an internally threaded aperture and including, in combination: a flanged disk and a threaded plug universally and detachably joined together; and means on said disk by which the same is adapted to be rotated, substantially as specified.

5. A self-seating rotatable bung including, in combination: a flanged disk; an exteriorly threaded rotatable plug adapted to coöperate with an interiorly threaded bushing; a bolt threaded into one of said members and passing through an enlarged recess in the other of said members for attaching the same together; and means by which said disk may be rotated, substantially as specified.

6. A self-seating bung including, in combination: an exteriorly threaded plug adapted to be screwed into a threaded bunghole bushing; a flanged disk provided with a sealing gasket adapted to coöperate with said bushing; and means for connecting said plug and disk together, with a universal joint, with the disk outwardly of or above said plug, substantially as specified.

7. A self-seating bung including, in combination: an exteriorly threaded plug having an enlarged recess therein; a flanged disk having a sealing gasket; an angular boss formed on said disk and adapted to be seated in a correspondingly formed socket in said plug; and a bolt passing through said recess in the plug and threaded into the disk, substantially as specified.

8. A self-seating bung including in combination an exteriorly threaded plug adapted to be screwed into a threaded bung-hole bushing, a flanged disk provided with a sealing gasket adapted to coöperate with said bushing, and means for connecting said plug and disk together with a universal joint, the disk being disposed outwardly of or above said point, substantially as specified.

CHARLES T. CHILDERS.

Witnesses:
 Wm. D. Godfrey,
 Vera Louk.